United States Patent
Alkan

(10) Patent No.: US 10,680,674 B2
(45) Date of Patent: Jun. 9, 2020

(54) SYSTEMS AND METHODS FOR SUPPRESSING RADIOFREQUENCY NOISE FROM A MODEM

(71) Applicant: PPC BROADBAND, INC., East Syracuse, NY (US)

(72) Inventor: Erdogan Alkan, Manlius, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 16/299,990

(22) Filed: Mar. 12, 2019

(65) Prior Publication Data

US 2019/0363753 A1 Nov. 28, 2019

Related U.S. Application Data

(60) Provisional application No. 62/674,869, filed on May 22, 2018.

(51) Int. Cl.
| | | |
|---|---|---|
| *H04B 3/32* | (2006.01) | |
| *H04B 3/50* | (2006.01) | |
| *H04B 3/28* | (2006.01) | |
| *H04B 3/42* | (2006.01) | |

(52) U.S. Cl.
CPC .............. *H04B 3/32* (2013.01); *H04B 3/28* (2013.01); *H04B 3/42* (2013.01); *H04B 3/50* (2013.01)

(58) Field of Classification Search
CPC ... H04B 3/32; H04B 3/28; H04B 3/42; H04B 3/50
USPC .......................................................... 333/12
See application file for complete search history.

(56) References Cited

U.S. PATENT DOCUMENTS

| | | | |
|---|---|---|---|
| 5,091,707 | A | 2/1992 | Wollmerschauser et al. |
| 9,602,076 | B1 | 3/2017 | Kreuzer et al. |
| 2003/0117333 | A1 | 6/2003 | McLean |
| 2005/0156796 | A1 | 7/2005 | Nysen |
| 2006/0227884 | A1 | 10/2006 | Koga et al. |

OTHER PUBLICATIONS

Shane Thomas (Authorized Officer), International Search Report and Written Opinion dated May 28, 2019, PCT Application No. PCT/US2019/021858, pp. 1-8.

*Primary Examiner* — Robert J Pascal
*Assistant Examiner* — Kimberly E Glenn
(74) *Attorney, Agent, or Firm* — MH2 Technology Law Group LLP

(57) ABSTRACT

A cord for suppressing noise from a modem includes a hot wire, a neutral wire, and a signal balancing device. The hot wire is configured to connect to a hot power port of a modem. The neutral wire is configured to connect to a neutral power port of the modem. The signal balancing device is configured to connect to an outer conductor of a coaxial radiofrequency (RF) port of the modem and to the neutral wire or a ground wire. The signal balancing device is configured to balance RF signals transmitted through the coaxial RF port.

20 Claims, 5 Drawing Sheets

SYSTEMS AND METHODS FOR SUPPRESSING RADIOFREQUENCY NOISE FROM A MODEM

CROSS-REFERENCE TO RELATED APPLICATIONS

This application claims priority to U.S. Provisional Patent Application No. 62/674,869, filed on May 22, 2018, the entirety of which is incorporated herein by reference.

BACKGROUND

Modems are one of the main connection hubs in a subscriber's premises (e.g., a home) and allow for communication with an external network, both upstream and downstream. The modem conditions the internal communication signals (i.e., inside the home) as well as the external communication signals from the network. While communicating, the modem sends and receives desired signals between two ends (e.g., the home and network). The desired signals may be in a predetermined frequency band. For example, when the network is a cable television (CATV) network, the external network signals may be in a (CATV) frequency band.

The predetermined frequency band may also contain undesirable signals (e.g., noise). The noise may be the result of the modem having loose connectors, oxidation, and/or corrosion (e.g., on a center conductor). Each modem that generates this noise contributes to the overall/aggregate noise level in the entire CATV system. As the number of modems in the CATV system that generate noise increases, the quality of service (QoS) of the CATV system thus decreases.

SUMMARY

A system for suppressing radiofrequency (RF) noise from a modem is disclosed. The system includes a modem and a cord. The modem includes a hot power port, a neutral power port, and a coaxial radiofrequency (RF) port including an inner conductor and an outer conductor. The coaxial RF port is configured to communicate signals with an external network. The cord includes a hot wire configured to connect to the hot power port, a neutral wire configured to connect to the neutral power port, and a signal balancing device configured to connect to the outer conductor of the coaxial RF port and to the neutral wire or a ground wire. The signal balancing device includes a coaxial choke configured to attenuate a predetermined shield current of the signals via field conversion. The signal balancing device also includes a capacitor connected in series with the coaxial choke. The capacitor is configured to balance the signals transmitted through the inner conductor and the outer conductor of the coaxial RF port.

A cord for suppressing noise from a modem is also disclosed. The cord includes a hot wire configured to connect to a hot power port of a modem. The cord also includes a neutral wire configured to connect to a neutral power port of the modem. The cord also includes a signal balancing device configured to connect to an outer conductor of a coaxial radiofrequency (RF) port of the modem and to the neutral wire or a ground wire. The signal balancing device is configured to balance RF signals transmitted through the coaxial RF port.

In another embodiment, the cord includes a hot wire configured to connect to a hot power port of a modem. The cord also includes a neutral wire configured to connect to a neutral power port of the modem. The cord also includes a signal balancing device including a capacitor. The signal balancing device is configured to be connected to an outer conductor of a coaxial radiofrequency (RF) port of the modem and to the neutral wire or a ground wire. The signal balancing device is configured to balance RF signals transmitted through the coaxial RF port.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

DETAILED DESCRIPTION

The present disclosure relates to systems and methods that reduce/attenuate the amount of noise generated by a faulty modem. More particularly, the systems and methods described herein reduce/attenuate the amount of noise introduced into a CATV system by a faulty modem. As used herein, a "faulty modem" refers to a modem that generates a predetermined (e.g., significant) amount of noise (e.g., in response to the modem having loose connectors, oxidation, corrosion, etc.). A predetermined or significant amount of noise can be defined as the noise signals that reduce the QoS for a premise and/or the cable system. Noise signals accumulate from multiple faulty modems in the CATV system. Thus, reducing the noise generated by the faulty modems improves the overall performance of the CATV system. As an example, with a −50 dBmV noise level, the faulty modem contribution in the return band may be as high as +3 dBmV peak.

As described in greater detail below, in some embodiments, the modem may initially include a two-wire power cord, and the systems and methods disclosed herein may replace the two-wire power cord with a three-wire (e.g., retrofit) power cord that mitigates the noise to the ground of the house. This may divert a significant amount of the noise from being transmitted into the CATV system and affecting other modems in other subscriber premises and/or the CATV head end.

Figure 1:
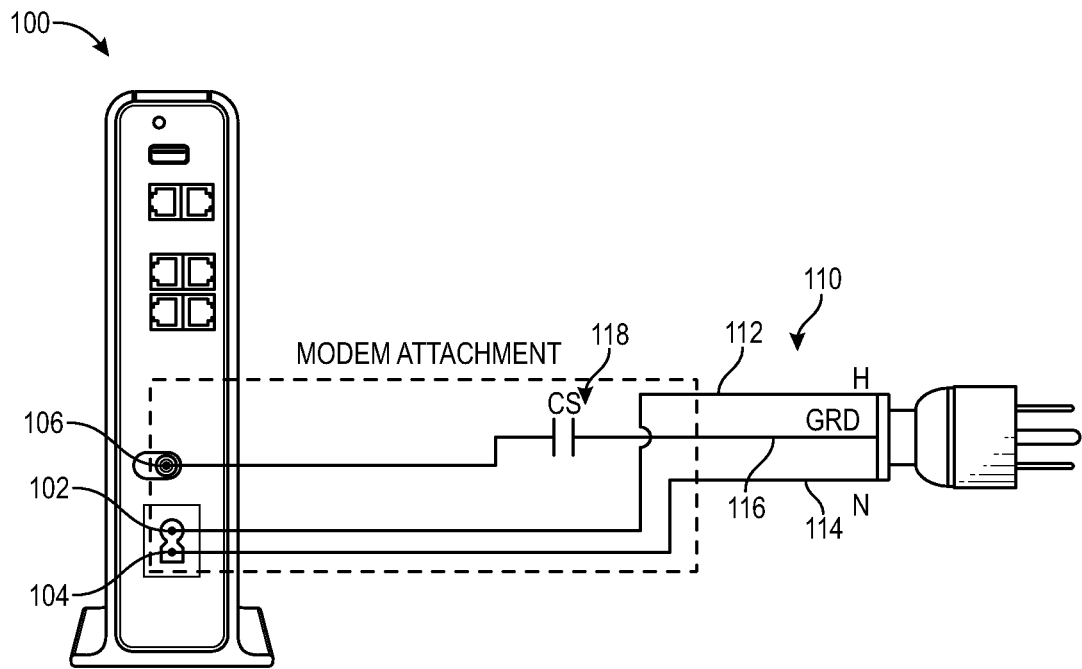
FIG. 1 illustrates a schematic view of an example of a three-wire power cord for a faulty modem, according to an embodiment.

FIG. 1 illustrates a schematic view of an example of a three-wire power cord 110 for a faulty modem 100, according to an embodiment. The modem 100 may include one or more alternating current (AC) power ports. More particularly, the modem 100 may include a first (e.g., hot) power port 102 and a second (e.g., neutral) power port 104. The hot power port 102 and the neutral power port 104 receive AC power for the active devices inside the modem 100. The modem 100 may also include a coaxial radiofrequency (RF) port 106 that is configured to send and receive the RF communication signals when connected to an external network, such as a CATV network, via a coaxial cable. For example, when a user clicks send on an email in a computing system that is connected to the modem 100, data packets representing the email may be sent as one or more RF communication signals to the network (e.g., the internet service provider (ISP), which may be a CATV network) via the coaxial RF port 106. The coaxial RF port 106 may include a first (e.g., outer) conductor and a second (e.g., inner) conductor. The outer conductor may also be referred to as a tubular conducting shield.

The power cord 110 may include a first (e.g., hot) wire 112, a second (e.g., neutral) wire 114, and a third (e.g., ground) wire 116. The hot wire 112 may be connected to the hot power port 102, the neutral wire 114 may be connected to the neutral power port 104, and the ground wire 116 may be connected to the coaxial RF port 106. Connecting the ground wire 116 to the outer conductor of the coaxial RF port 106 may divert noise signals (e.g., due to discontinuity) to ground, so that the noise signals are not transmitted along with the RF communication signals back into the CATV system.

The ground wire 116 may include a capacitor 118. The value of the capacitor 118 may be selected so that the noise signals can pass through the ground wire 116. The capacitor 118 may have a capacitance from about 1000 pF to about 5000 pF or about 2000 pF to about 4000 pF. As an example, the capacitor 118 may have a capacitance of 3000 pF to pass noise signals above 5 MHz through the ground wire 116. The capacitor 118 may serve to complete the circuit loop for noise signals. The capacitor 118 may also or instead balance the RF signals flowing through the inner conductor and/or the outer conductor of the coaxial RF port 106.

Figure 2:
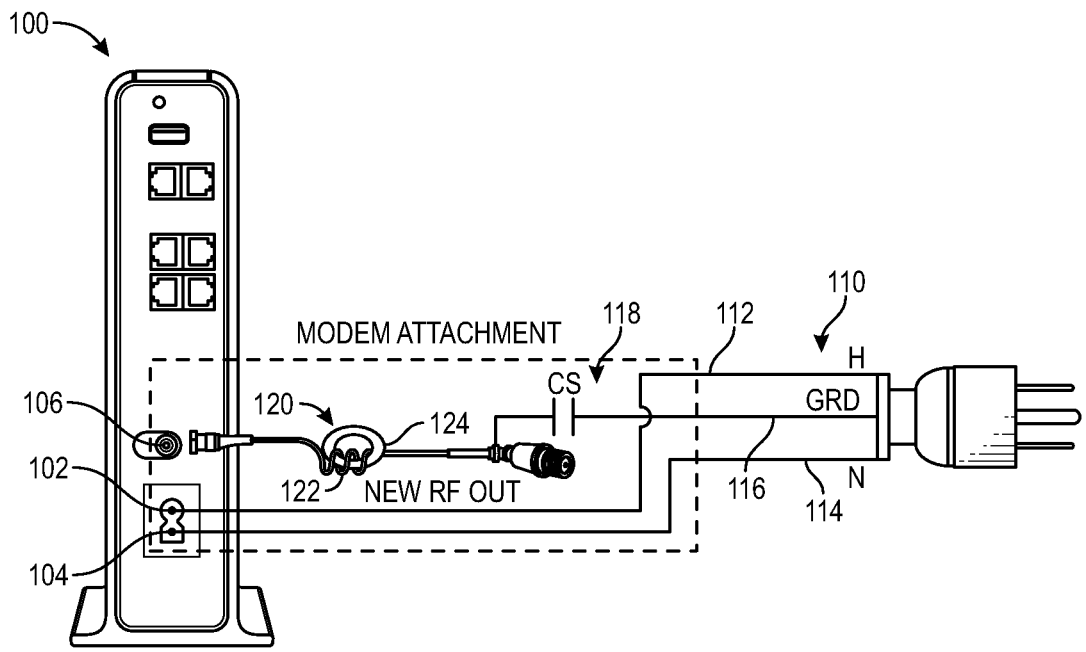
FIG. 2 illustrates a schematic view of another example of a three-wire power cord for a faulty modem, according to an embodiment.

FIG. 2 illustrates a schematic view of another example of the three-wire power cord 110 with a coaxial choke 120, according to an embodiment. As shown, the coaxial choke 120 may be added in series with the capacitor 118 in the ground wire 116. The coaxial choke 120 may be positioned between the coaxial RF port 106 and the capacitor 118. The cord 110, including the capacitor 118 and the coaxial choke 120, may be external to the modem 110. The coaxial choke 120 may be or include a coaxial ferrite cable 122 that is wrapped one or more times around a toroid 124 to balance differential signals flowing through the inner conductor and/or the outer conductor of the coaxial RF port 106. The coaxial choke 120 may be configured to attenuate the undesired shield currents via field conversion through the cable 122 and/or toroid 124. More particularly, the coaxial choke 120 may be configured to attenuate the undesired shield currents before reaching the capacitor 118. In at least one embodiment, the capacitor 118, the coaxial choke 120, or both may be referred to as a signal balancing device or a signal balancing circuit.

Figure 3:
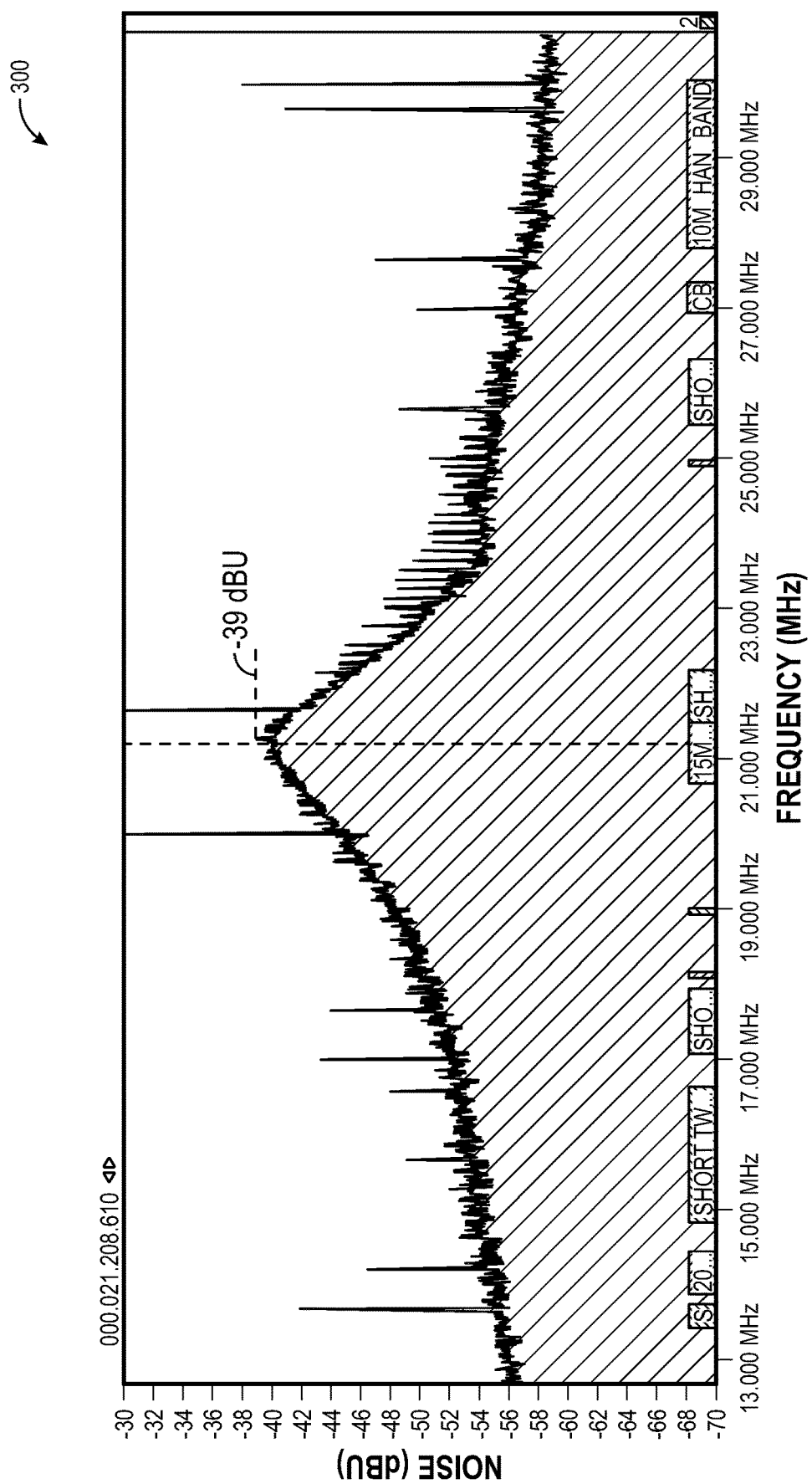
FIG. 3 illustrates a schematic view of a graph including an example of a noise signature of a faulty modem in a return band of a CATV system, according to an embodiment.

FIG. 3 illustrates a schematic view of a graph 300 including an example of a noise signature of a faulty modem (e.g., modem 100) in a return band of a CATV system, according to an embodiment. The noise signature is measured for a worst-case scenario by contacting the center conductor of the measurement equipment to the outer conductor of the modem's RF port (e.g., port 106). In this example, the relative measured peak value of the noise is −39 dBU at about 21 MHz.

Figure 4:
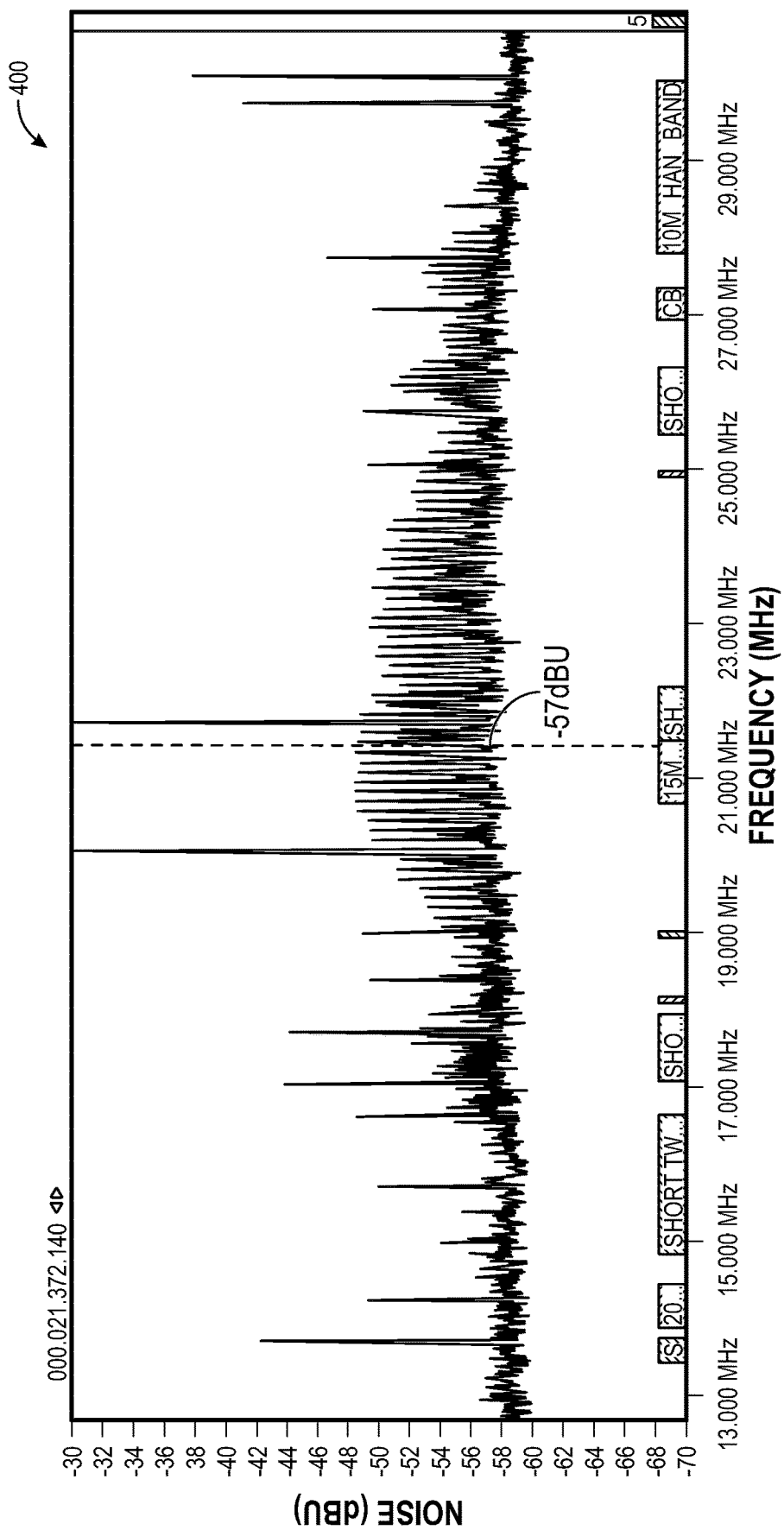
FIG. 4 illustrates a schematic view of a graph including an example of a noise floor of the measurement equipment when touched to a modem F-connector, according to an embodiment.

FIG. 4 illustrates a schematic view of a graph 400 including an example of a noise floor of the measurement equipment when touched to the outer conductor of the faulty modem's RF port (e.g., port 106), according to an embodiment. More particularly, the graph 400 shows the spectrum of the direct contact when no power is applied to the modem (e.g., modem 100). In this example, the relative measured noise floor is about −57 dBU at about 21 MHz.

Figure 5:
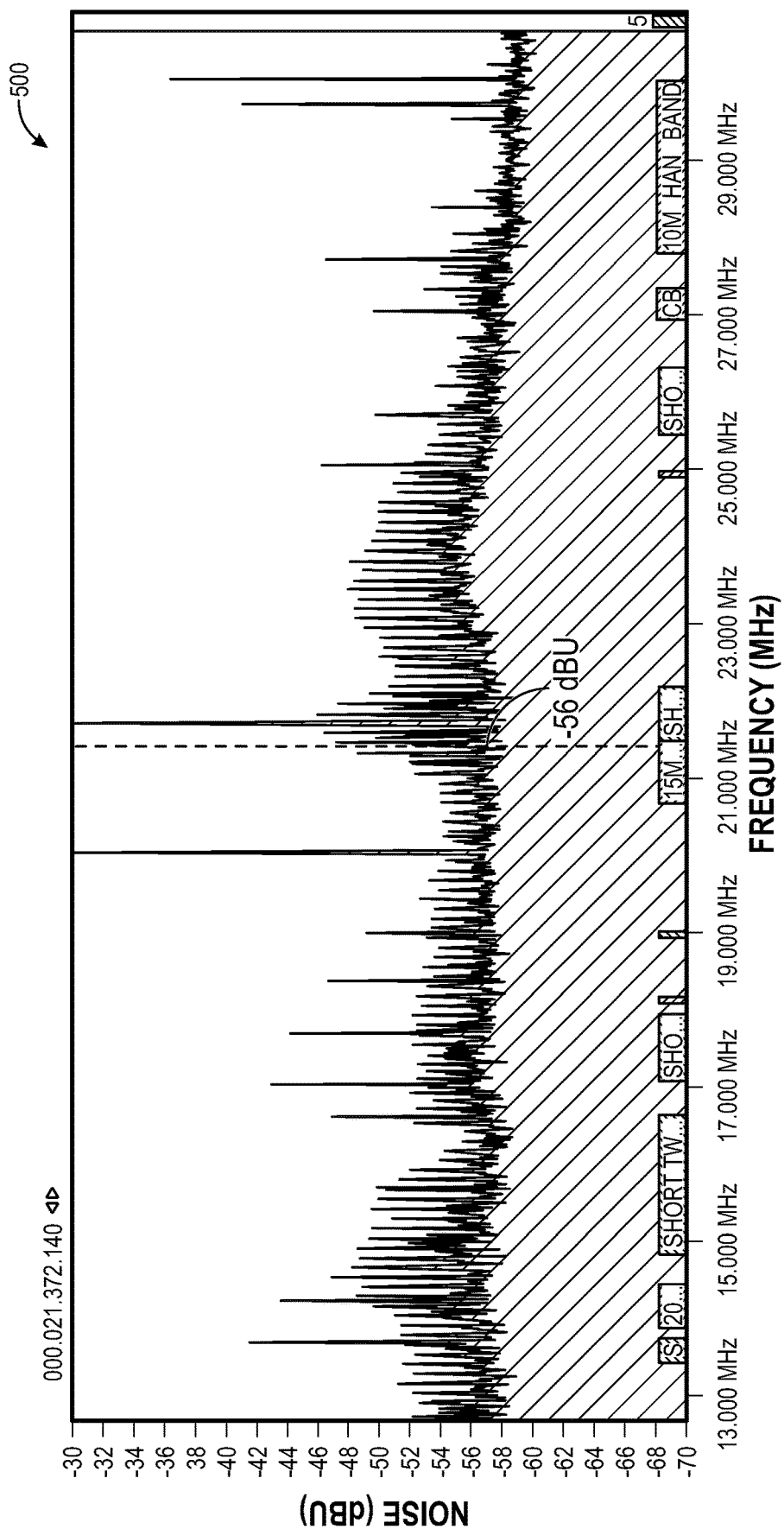
FIG. 5 illustrates a schematic view of a graph including an example of a noise signature of a faulty modem in a return band of a CATV system after the power cord (e.g., of FIG. 2) has been connected, according to an embodiment.

FIG. 5 illustrates a graph 500 including an example of a noise signature of the faulty modem 100 after the power cord 110 of FIG. 2 (i.e., including the coaxial choke 120) has been connected, according to an embodiment. The frequency of the signals is about 21 MHz, and the coaxial RF port 106 is in direct contact with a spectrum analyzer. As can be seen in FIG. 5, the noise is filtered down to close to the noise floor of the measurement equipment (e.g., about −56 dBU) at about 21 MHz.

Thus, when looking at FIGS. 3-5, it may be seen that the noise amount injected to the system is reduced by about 12 dB to about 20 dB when the power cord 110 of FIG. 2 is used, which represents about $\frac{1}{16}^{th}$-$\frac{1}{32}^{nd}$ of the initial noise power. In other embodiments, the noise amount injected into the system may be reduced by about 5 dB to about 30 dB or about 8 dB to about 25 dB. This level can be improved more by adding more coaxial windings around the ferrite material to attenuate the unbalanced shield current.

Figure 6:
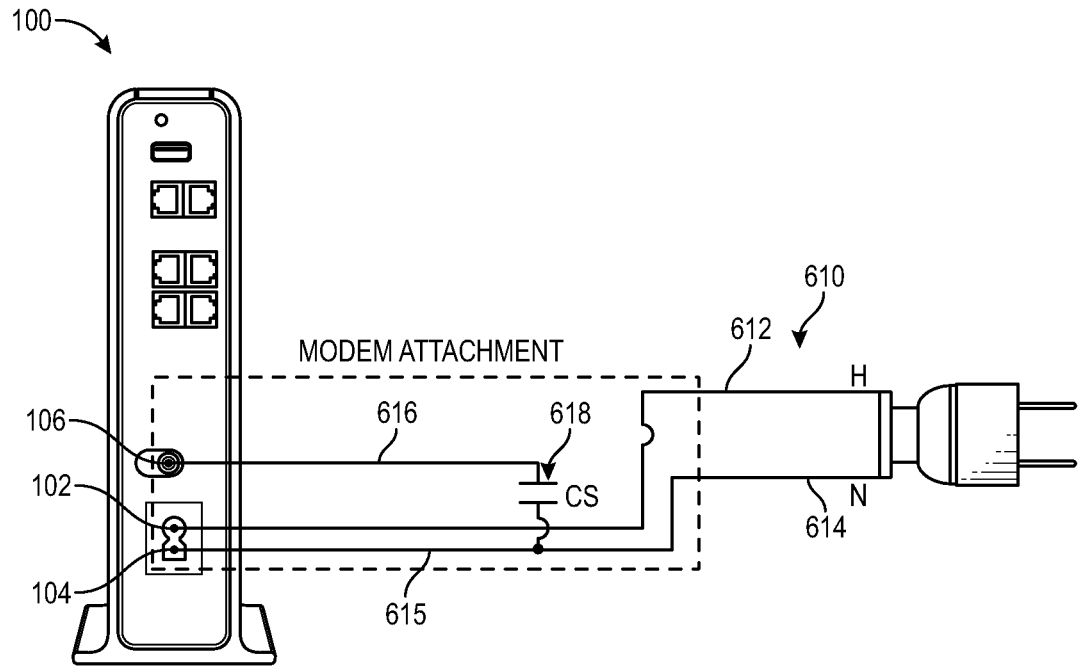
FIG. 6 illustrates a schematic view of an example of a two-wire power cord for a faulty modem, according to an embodiment.

FIG. 6 illustrates a schematic view of an example of a two-wire power cord 610 for the faulty modem 100, according to an embodiment. The power cord 610 includes a first (e.g., hot) wire 612 and a second (e.g., neutral) wire 614. The ground wire is omitted in this embodiment. As shown, the neutral wire 614 may be split into a first portion 615 and a second portion 616. The hot wire 612 may be connected to the hot power port 102, the first portion 615 of the neutral wire 614 may be connected to the neutral power port 104, and the second portion 616 of the neutral wire 614 may be connected to the (e.g., outer conductor of the) coaxial RF port 106. With no ground wire, the neutral wire 614 serves as an alternative path for the noise to complete its loop. Thus, rather than travelling through the coax system, the noise may be transmitted back to the point in the modem 100 where it is generated to dissipate internally and increase the level of immunity of the coax system being affected by the noise.

Connecting the second portion 616 of the neutral wire 614 to the (e.g., outer conductor of the) coaxial RF port 106 may divert unwanted noise signals back to where they are generated by balancing the differential signal when there is a loose (e.g., high contact resistance) or discontinuous (e.g., broken) ground. More particularly, the internal circuit of the modem may produce noise signals. This noise affects the chassis of the modem 100. When the chassis of the modem 100 is connected to the neutral wire 614, noise can be diverted or looped back to the circuit in the modem. For example, the unwanted noise signals may be diverted back to the noise source in the faulty modem 100. As used herein, "differential signal" here refers to signals that do not complete the circuit loop because of ground discontinuity. The signal on a continuous transmission line may be balanced. More particularly, the RF signals are balanced between the inner and outer conductors of the coaxial transmission line. However, when the center conductor is continuous, and the outer conductor has a high resistance or is discontinuous, the current in/on the outer and inner conductors may be unbalanced. To balance the signals, the difference may be attenuated by winding the transmission line around a toroid, as shown in FIG. 7 and described below.

The second portion 616 of the neutral wire 614 may include a capacitor 618. The capacitor 618 may have a capacitance similar to the capacitor 118 described above.

Figure 7:
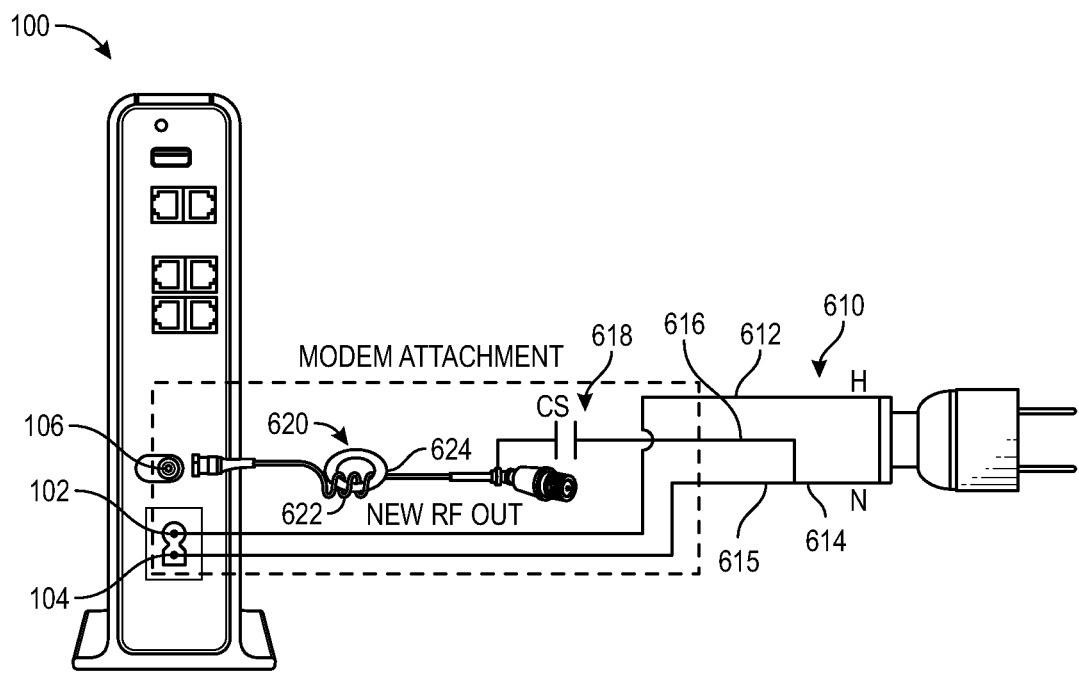
FIG. 7 illustrates a schematic view of another example of a two-wire power cord for a faulty modem, according to an embodiment.

FIG. 7 illustrates a schematic view of another example of the two-wire power cord 610 with a coaxial choke 620, according to an embodiment. As shown, the coaxial choke 620 may be added in series with the capacitor 618 in the second portion 616 of the neutral wire 614. The coaxial choke 620 may be similar to the coaxial choke 120 described above and thus may include a coaxial ferrite cable 622 that is wrapped one or more times around a toroid 624. This may be an improvement upon the embodiment on FIG. 6 because it attenuates the undesired shield currents via field conversion through the coaxial ferrite cable 622 and/or the toroid 624.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. A system for suppressing noise from a modem, comprising:
   a modem comprising:
      a hot power port;
      a neutral power port; and
      a coaxial radiofrequency (RF) port comprising an inner conductor and an outer conductor, the coaxial RF port being configured to communicate signals with an external network; and
   a cord comprising:
      a hot wire configured to connect to the hot power port;
      a neutral wire configured to connect to the neutral power port; and
      a signal balancing device configured to connect to the outer conductor of the coaxial RF port and to the neutral wire or a ground wire, wherein the signal balancing device comprises:
         a coaxial choke configured to attenuate a predetermined shield current of the signals via field conversion; and a capacitor connected in series with the coaxial choke, wherein the capacitor is configured to balance the signals transmitted through the inner conductor and the outer conductor of the coaxial RF port.

2. The system of claim 1, wherein the cord further comprises the ground wire, which is configured to be connected to a ground, wherein at least a portion of the signals are transmitted through the ground wire to the ground to prevent the portion of the signals from being transmitted into the external network, and wherein the external network comprises a cable television (CATV) system.

3. The system of claim 1, wherein the neutral wire comprises a first portion and a second portion, wherein the first portion is configured to connect to the neutral power port, wherein the second portion is configured to connect to the outer conductor of the coaxial RF port, and wherein the capacitor and the coaxial choke are connected to the second portion.

4. The system of claim 3, wherein the cord does not include the ground wire.

5. The system of claim 1, wherein the cord reduces noise signals transmitted from the modem to a cable television (CATV) system from about 12 dB to about 20 dB.

6. The system of claim 1, wherein the coaxial choke comprises a coaxial ferrite cable that is wrapped one or more times around a toroid.

7. A cord for suppressing noise from a modem, comprising:
   a hot wire configured to connect to a hot power port of a modem;
   a neutral wire configured to connect to a neutral power port of the modem; and
   a signal balancing device configured to connect to an outer conductor of a coaxial radiofrequency (RF) port of the modem and to the neutral wire or a ground wire, wherein the signal balancing device is configured to balance RF signals transmitted through the coaxial RF port.

8. The cord of claim 7, further comprising the ground wire, which is configured to be connected to the outer conductor of the coaxial RF port and to a ground, wherein the signal balancing device is connected to the ground wire, and wherein noise signals from the modem are transmitted through the ground wire to the ground to prevent the noise signals from being transmitted into a cable television (CATV) system.

9. The cord of claim 7, wherein the neutral wire includes a first portion and a second portion, wherein the first portion is configured to connect to the neutral power port, wherein the second portion is configured to connect to the outer conductor of the coaxial RF port, and wherein the signal balancing device is connected to the second portion.

10. The cord of claim 7, wherein the cord does not include the ground wire.

11. The cord of claim 7, wherein the signal balancing device comprises a capacitor that is configured to complete a circuit loop for noise signals generated by the modem.

12. The cord of claim 11, wherein the signal balancing device further comprises a coaxial choke connected in series with the capacitor and configured to connect to the outer conductor of the coaxial RF port, wherein the coaxial choke comprises a coaxial ferrite cable and a toroid, and wherein the coaxial choke is configured to attenuate the noise signals generated by the modem via field conversion through the coaxial ferrite cable, the toroid, or both.

13. The cord of claim 12, wherein the coaxial choke is configured to balance differential signals flowing through the outer conductor of the cord.

14. The cord of claim 13, wherein connecting the capacitor and the coaxial choke to the outer conductor of the coaxial RF port of the modem reduces the noise signals transmitted from the modem to a cable television (CATV) system from about 12 dB to about 20 dB.

15. A cord for suppressing noise from a modem, comprising:
   a hot wire configured to connect to a hot power port of a modem;
   a neutral wire configured to connect to a neutral power port of the modem; and
   a signal balancing device comprising a capacitor, the signal balancing device being configured to be connected to an outer conductor of a coaxial radiofrequency (RF) port of the modem and to the neutral wire or a ground wire, wherein the signal balancing device is configured to balance RF signals transmitted through the coaxial RF port.

16. The cord of claim 15, further comprising the ground wire, which is configured to be connected to the outer conductor of the coaxial RF port and to a ground, wherein the capacitor is connected to the ground wire, and wherein noise signals from the modem are transmitted through the ground wire to the ground to prevent the noise signals from being transmitted into a cable television (CATV) system.

17. The cord of claim 15, wherein the neutral wire includes a first portion and a second portion, wherein the first portion is configured to connect to the neutral power port, wherein the second portion is configured to connect to the outer conductor of the coaxial RF port, and wherein the capacitor is connected to the second portion.

18. The cord of claim 17, wherein the cord does not include the ground wire.

19. The cord of claim 15, further comprising a coaxial choke configured to be connected in series with the capacitor, wherein the coaxial choke comprises a coaxial ferrite cable that is wrapped one or more times around a toroid, and wherein the coaxial choke is configured to attenuate noise signals generated by the modem via field conversion through the coaxial ferrite cable, the toroid, or both.

20. The cord of claim 15, wherein connecting the signal balancing device to the outer conductor of the coaxial RF port of the modem reduces noise signals transmitted from the modem to a cable television (CATV) system from about 12 dB to about 20 dB.

* * * * *